(12) United States Patent
Muttik (10) Patent No.: US 8,627,458 B2
(45) Date of Patent: Jan. 7, 2014

(54) DETECTING MALICIOUS COMPUTER PROGRAM ACTIVITY USING EXTERNAL PROGRAM CALLS WITH DYNAMIC RULE SETS

(75) Inventor: Igor Garrievich Muttik, Berkhamsted (GB)

(73) Assignee: McAfee, Inc., Santa Clara, CA (US)

( * ) Notice: Subject to any disclaimer, the term of this patent is extended or adjusted under 35 U.S.C. 154(b) by 2199 days.

(21) Appl. No.: 10/755,450

(22) Filed: Jan. 13, 2004

(65) Prior Publication Data
US 2005/0154900 A1    Jul. 14, 2005

(51) Int. Cl.
H04L 29/06    (2006.01)
(52) U.S. Cl.
USPC .............................................. 726/22; 726/24
(58) Field of Classification Search
None
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,013,395 B1 * | 3/2006 | Swiler et al. | 726/25 |
| 7,093,239 B1 * | 8/2006 | van der Made | 717/135 |
| 7,096,498 B2 * | 8/2006 | Judge | 726/22 |
| 7,162,741 B2 * | 1/2007 | Eskin et al. | 726/25 |
| 7,337,155 B2 * | 2/2008 | Yoshida | 706/15 |
| 7,506,155 B1 | 3/2009 | Stewart et al. | |
| 2002/0138755 A1 * | 9/2002 | Ko | 713/201 |
| 2004/0064736 A1 * | 4/2004 | Obrecht et al. | 713/201 |
| 2005/0108562 A1 * | 5/2005 | Khazan et al. | 713/200 |

OTHER PUBLICATIONS

Warrender, "Detecting Intrusions Using System Calls: Alternative Data Models", Dept. of Computer Science, University of New Mexico, 1999, p. 133-145.*
Hofmeyr, "Intrusion Detection using Sequence of System Calls", Dept. of Computer Science, University of New Mexico, 1998, p. 1-25.*

* cited by examiner

*Primary Examiner* — Benjamin Lanier
(74) *Attorney, Agent, or Firm* — Patent Capital Group (57) ABSTRACT

A stream 14 of external computer program calls made from an application program 2 to an operating system 4 is logged by an anti-malware layer 8. This stream 14 is examined for a primary set XYZ of external program calls known to be associated with malicious computer program activity. When such a primary set XYZ of external computer program calls is identified, the malicious activity is blocked and the logged stream 14 is examined to determine one or more secondary sets of external program calls which are now added to the set of rules 10 against which the logged stream 14 of external program calls is tested. In this way the set of rules 10 is dynamically adapted so as to more rapidly and proactively identify malicious computer program activity.

47 Claims, 5 Drawing Sheets

DETECTING MALICIOUS COMPUTER PROGRAM ACTIVITY USING EXTERNAL PROGRAM CALLS WITH DYNAMIC RULE SETS

BACKGROUND OF THE INVENTION

1. Field of the Invention

This invention relates to the field of data processing systems. More particularly, this invention relates to the detection of malicious computer program activity, such as, for example, as the result of computer viruses, worms, Trojans and the like, using detected characteristics of external program calls.

2. Description of the Prior Art

It is known to provide anti-virus systems which examine computer files to be accessed to determine characteristics of those computer files known to be indicative of malware, such as computer viruses, worms, Trojans and the like. Such techniques are necessarily reactive in that a new piece of malware must first be released and identified before the characteristics of that new piece of malware can be determined such that the detection mechanisms can be updated to detect that new piece of malware. An alternative type of anti-virus system uses heuristic methods in which the computer file is examined to identify types of activity it is controlling and, if these match known suspicious types of activity, then an anti-malware response may be triggered. Whilst such an approach can provide some protection against newly released malware, it does suffer from requiring a disadvantageously high processing overhead.

It is also known to provide anti-virus systems which examine the behaviour of a computer system at the level of external program calls being made to the operating system. It has been found that certain sequences of external program calls, or combinations of external program calls with certain characteristics, are indicative of malicious computer program activity and may be used to trigger anti-malware responses. A problem with this behavioural analysis approach is that the malicious activity against which a defense is being sought is allowed to occur prior to it being detected. Accordingly, some damage may already have been inflicted upon the computer system concerned by the malicious computer program activity, e.g. the malicious computer program may already have managed to replicate itself and infect further machines.

SUMMARY OF THE INVENTION

Viewed from one aspect the present invention provides a computer program product operable to detect malicious computer program activity, comprising:

logging code operable to log a stream of external program calls;

primary set identifying code operable to identify, within said stream of external program calls, a primary set of one or more external program calls matching one or more rules indicative of malicious computer program activity from among a set of rules;

secondary set identifying code operable to identify, within said stream, at least one secondary set of one or more external program calls associated with said primary set of one or more external program calls; and modifying code operable to modify said set of rules such that said at least one secondary set of one or more external program calls are more strongly associated with malicious computer program activity.

The present technique recognises that external program calls logged in association with the primary set of external program calls known to correspond to malicious computer program activity may themselves subsequently be used as an indicator for malicious computer program activity. The secondary sets of external program calls are "tainted" by their association with the primary set of external program calls and the set of rules may be modified to be more sensitive to the secondary set of external program calls. In this way, the set of rules associated with malicious computer program activity may be extended and the detection made potentially more sensitive, reliable and proactive. It will be appreciated that in the context of the present technique, external program calls also encompasses calls to the standard libraries within the same program.

It will be appreciated that the secondary set of one or more external program calls could take any relative temporal location compared to the primary set of external program calls providing it is associated therewith, e.g. originates from the same computer program, memory region, thread etc, but in preferred embodiments the secondary set of one or more external program calls precedes the primary set of one or more external program calls within the stream of execution. In this way, the modified/new rules added to this set of rules are able to detect malicious computer program activity earlier and possibly reduce or prevent damage caused by the malicious computer program activity.

It will be appreciated that the external computer program calls may take a variety of different forms, but these are preferably application program interface calls to an operating system. Such calls are clearly defined and accessible within a computer system. This makes them relatively easy to intercept and analyse. It will be appreciated that the computer calls being made can in themselves be analysed as well as the results returned from those external program calls. The characteristics indicative of malicious computer activity may be characteristics of the returned results associated with the external program calls rather than the external program calls themselves or both.

The characteristics of the external program calls which may be analysed can vary considerably. In preferred embodiments these characteristics include at least one of a call name, a return address and one or more parameter values either outbound or inbound.

The rules against which the logged external program calls can be compared can take a wide variety of different forms, as will be familiar to those in the anti-malware field. A particularly convenient way of structuring this rule set is to use score values associated with certain characteristics or combinations of characteristics of external program calls. In this way, a logged stream may be analysed and when the total score value associated with that logged stream exceeds a threshold value, an anti-malware response may be triggered. Pattern matching or regular expressions are other convenient ways of storing rules.

In the context of such a rule set using score values, a particularly convenient way of modifying the rule set make it more sensitive to the secondary sets of external program calls is to increase the score values associated with such secondary sets of external program calls.

It will be appreciated that the rule set or rule sets being used may advantageously be responsive in desired circumstances to the particular ordering of external program calls. It may be that with one ordering a set of external program calls has no malicious result whereas in another specific ordering a malicious result is highly indicated.

The modification of the rule set can be seen effectively to perform a dynamic adaption of the set of rules in response to the detected stream of external program calls. Such a dynamic adaption provides a flexible approach to malware protection and also provides the computer system with a degree of auto immunity whereby it may respond without programmer intervention in a manner which makes it more resistant to malware attack.

The modified set of rules may be kept locally and applied locally after its modification and also may be advantageously transmitted to one or more remote computers and/or a rule supplier such that other users may also benefit from the modified rules.

It will be appreciated that the external program calls may be logged as they are executed, but in a higher security system it may be desirable to emulate execution of a computer program to determine its external program calls which may then be logged and examined against the set of rules.

The modification of these set of rules can take a variety of different forms, such as the above mentioned adjusting of the score values associated with certain sets and sequences of external program calls. In addition, new rules may be added to the existing set of rules as part of the modification of the set of rules.

In determining the secondary set of external program calls which may be associated with the primary set of external program calls for which malicious computer program activity has been detected, it is advantageous to identify a starting point of the malicious computer program activity from which external program calls may be logged and examined. Such starting points may correspond to the start of execution of a particular computer file, or a switch of memory region from which program instructions are being executed (e.g. a context switch).

In determining the validity and/or quality of the secondary set it is advantageous to check if the modifications have positive effect. This can be decided either internally (by applying some higher-level rules to the set modifications) or by external signal(s). An example of such an external signal could be a report that modified rule(s) decrease the malicious network traffic or slowdown the malware propagation. As an example, after a modified set is transmitted to other computers some network sensors detect the effect (e.g., decrease of traffic) and send a "positive" signal back. That raises the score or promotes a rule from "temporary" into "permanent" set.

Viewed from a further aspect a method of detecting malicious computer program activity, said method comprising the steps of:
  logging a stream of external program calls;
  identifying within said stream of external program calls a primary set of one or more external program calls matching one or more rules indicative of malicious computer program activity from among a set of rules;
  identifying within said stream at least one secondary set of one or more external program calls associated with said primary set of one or more external program calls; and
  modifying said set of rules such that said at least one secondary set of one or more external program calls are more strongly associated with malicious computer program activity.

Viewed from a still further aspect a data processing apparatus operable to detect malicious computer program activity, said apparatus comprising:
  logging logic operable to log a stream of external program calls;
  primary set identifying logic operable to identify, within said stream of external program calls, a primary set of one or more external program calls matching one or more rules indicative of malicious computer program activity from among a set of rules;
  secondary set identifying logic operable to identify, within said stream, at least one secondary set of one or more external program calls associated with said primary set of one or more external program calls; and
  modifying logic operable to modify said set of rules such that said at least one secondary set of one or more external program calls are more strongly associated with malicious computer program activity.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
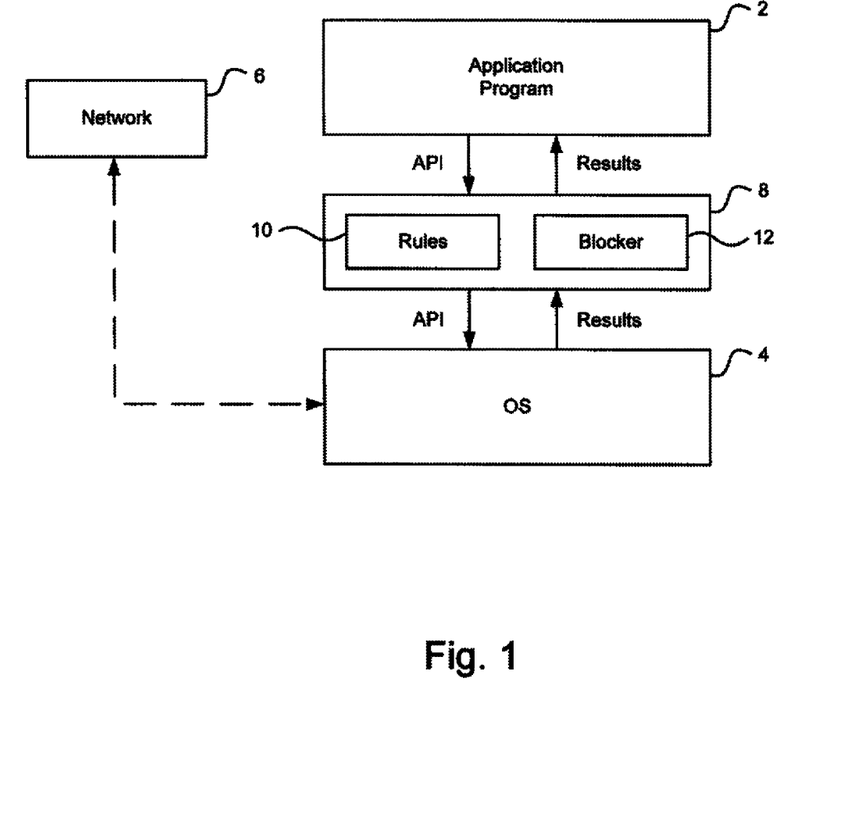
FIG. 1 schematically illustrates a malware detecting system.

FIG. 1 illustrates a system for detecting malicious computer program activity. An application program 2 executes in association with an operating system 4. The application program 2 issues external program calls, API calls, to the operating system 4 as is known and conventional in the computer programming field. These external calls result in desired processing operations being performed on behalf of the application program 2 and in some cases determined results are returned to the application program 2. The application program 2 may also communicate with a computer network 6 with which it may exchange data, messages, programs and the like.

As shown in FIG. 1, an anti-malware layer 8 is provided between the application program 2 and the operating system 4. The anti-malware layer 8 serves to intercept external program calls issued by the application program 2 to the operating system 4 and subject these external program calls to checking by a set of rules 10. This checking is performed by external program call blocking code 12 which includes within its functionality the logging of a stream of external program calls, the identification of a primary set of program instruction calls found to match a rule or set of rules within the rules 10 and corresponding to malicious computer program activity, and thereafter identify associated secondary sets of external program calls within the log stream which should now be more strongly associated with malicious computer program activity. If the anti-malware layer 8 does not detect malicious computer program activity associated within the stream of external program calls, then these program calls are passed to the operating system 4 where they are serviced and the results, where applicable, returned back through the anti-malware layer 8 to the application program 2. The results associated with a particular external program call may also be examined and form part of the rule comparisons performed by the blocker code 12 in determining whether a particular external program call or set of external program calls matches one of the rules for identifying malicious computer program activity.

Figure 2:
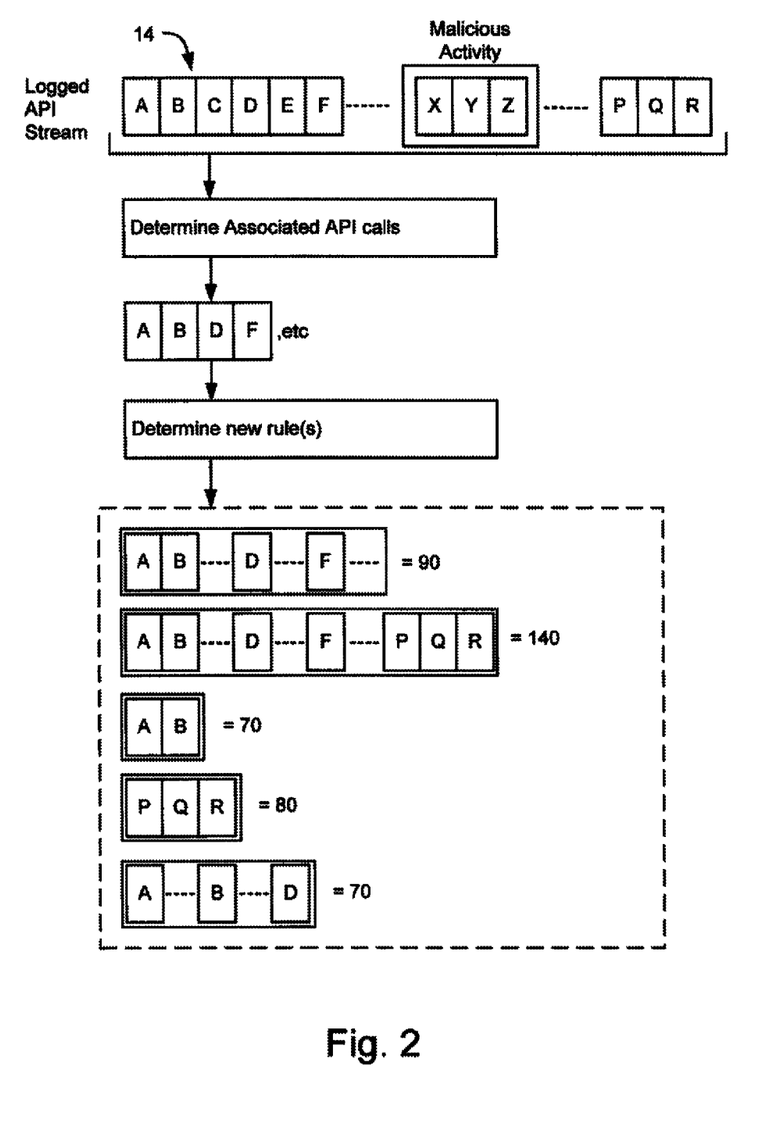
FIG. 2 schematically illustrates the logging of a stream of external program calls and the examination of that stream to determine new detection rules.

FIG. 2 illustrates a stream of external program calls 14 which are logged by the anti-malware layer 8. A primary set of external program calls XYZ within this stream 14 is identified by one or more of the rules 10 as corresponding to malicious activity and will in its own right trigger an anti-malware response. As well as triggering such an anti-malware response, the anti-malware layer 8 also determines associated secondary sets of external program calls which are associated with the primary set XYZ. As will be seen, some of these secondary sets of external program calls precede the primary set XYZ and some succeed the primary set XYZ.

The secondary sets of external program calls which are selected to be used as potential new rules are selected from the preceding and succeeding external program calls as those external program calls known to be of most potential significance and assistance in discriminating and identifying malicious computer activity. Some types of external program calls are common in both normal and malicious activity and accordingly of little use in selectively detecting malicious activity. However, other types of external program calls are unusual to an extent that when they occur having the particular characteristics of those external program calls logged as preceding or succeeding the known malicious primary set of external program calls XYZ, then these are in themselves highly indicative of malicious computer program activity.

As illustrated in FIG. 2, when the secondary sets of external program calls have been so selected, new rules may be determined based upon them. These rules can require a certain ordering or spacing between specific external program calls or alternatively may detect the external program calls in any order providing they are within a certain distance of one another. The more highly specific the combination of external program calls identified in a new rule and known to be associated with the malicious activity XYZ, the higher is made a score value to be associated with that new rule. A score value is used when a stream of external program calls is examined to determine whether or not a threshold value has been exceeded and anti-malware activity should be triggered.

In the example illustrated it will be seen that the primary set of external program calls XYZ which is detected as malicious activity results in the generation of plurality of new rules which serve to more strongly associate the secondary sets of external program calls with malicious activity. The secondary sets themselves may not be sufficient to trigger the anti-malware response, but their score values are increased such that when they occur in combination with other detected behavioural characteristics an anti-malware response will now be triggered. The rules in themselves may not be new, it may rather be that the score values associated with a particular secondary set of external program calls is increased due to its now known association with the primary set XYZ of external program calls which is malicious.

Figure 3:
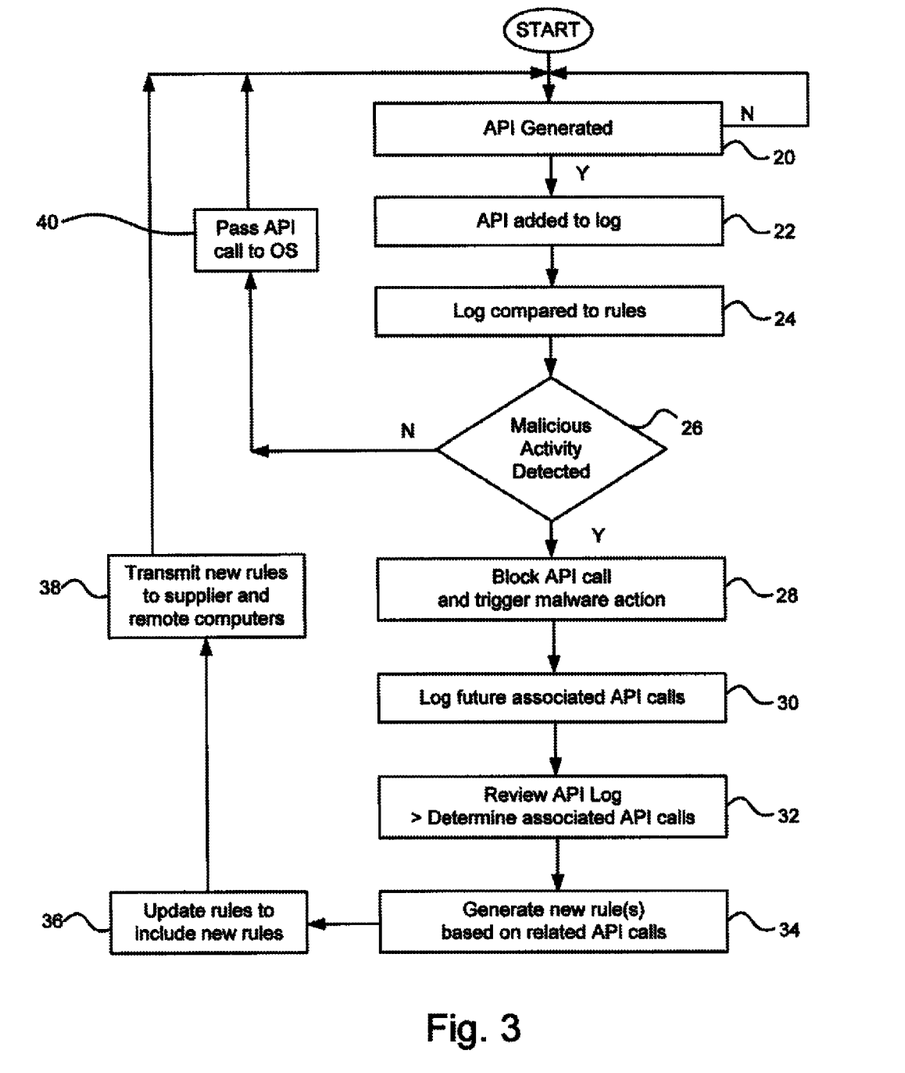
FIG. 3 is a flow diagram schematically illustrating processing steps associated with the examination of a stream of external program calls and the dynamic adaption of a set of rules for detecting malicious activity associated with that stream of external program calls.

FIG. 3 is a flow diagram schematically illustrating the type of operation discussed in relation to FIG. 2. At step 20 the anti-malware layer 8 waits for an API call to be received. At step 22 a received API call is added to a log. At step 24 the logged API calls (optionally in combination with their associated returned results) are compared to a set of rules 10. If the result of the comparison with the rules 10 indicates malicious activity at step 26, then processing proceeds to step 28 where the API call concerned is blocked and an anti-malware action triggered. In case of a blocked API call(s) subsequent replies may be simulated to enable 'as-normal' further execution of the program. At step 30 the future stream of external program calls subsequent to the malicious activity is also logged (e.g. through emulation), such that these can be associated within the set of rules with the malicious activity as well as the already logged proceeding external program calls. At step 32, the logged external program calls are examined to determine secondary sets of external program calls which are to be subject to the generation of new rules or the modification of existing rules. In this review of the logged external program calls a starting point associated with the malicious computer activity is identified and used as a cut off proceeding which external program calls are not examined. Examples of such a starting point are the detected start of execution of a particular computer program and/or a context switch detected by a change in the memory region from which a computer program instructions are being fetched.

Once the secondary sets of external program calls to have new or modified rules associated with them have been identified at step 32, the new rules concerned are generated at step 34 and updated into the set of rules 10 at step 36. The new rules or the complete new set of rules are then transmitted to a central rules supplier and optionally other remote computers at step 38 (via a network link 6), such that the supplier and the remote computers can benefit from the dynamic adaptation of the rules 10 which has occurred. Processing then returns to step 20.

If the determination at step 26 was that malicious activity was not associated with the newly-received external program call, then processing proceeds to step 40 at which that external program call is passed to the operating system 4 in the normal way.

Figure 4:
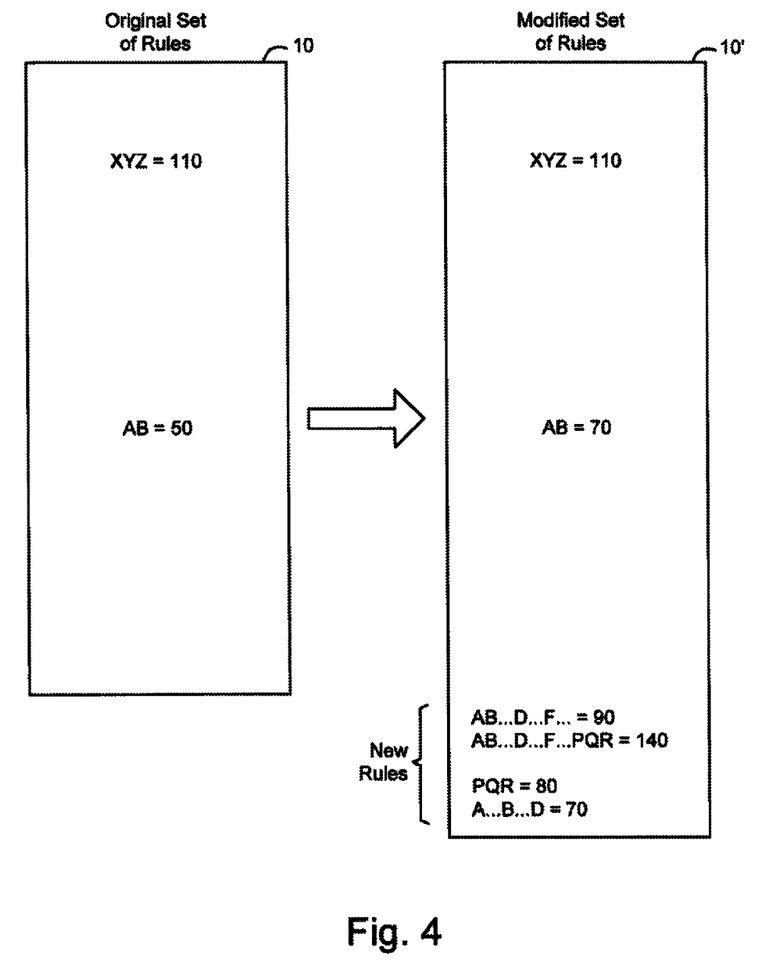
FIG. 4 schematically illustrates a modification to a set of rules.

FIG. 4 schematically illustrates a set of rules 10 and a modified set of rules 10'. As illustrated, both the original set of rules 10 and the modified set of rules 10' include a rule identifying the primary set of external program calls XYZ with a score value of 110. This is above the threshold value of 100 taken in this example to be indicative of malicious computer program activity. In the modified set of rules 10', the sequences of secondary sets of external program calls illustrated in FIG. 2 have been added together with their associated score values. The secondary set of external program calls AB was already present within the original set of rules 10, but in this case has had its score value increased from 50 to 70. New rules associated with the other four examples given in FIG. 2 have been appended to the end of the modified set of rules 10' and will in future be applied in detecting malicious computer activity by examining the logged stream of external program calls.

Figure 5:
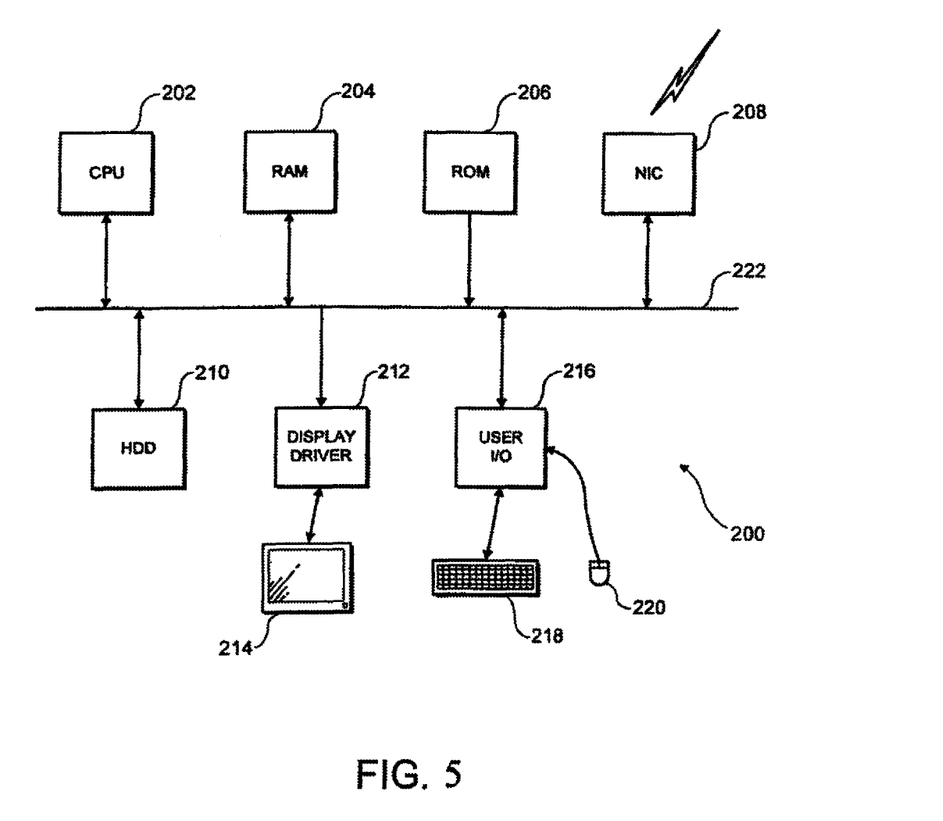
FIG. 5 schematically illustrates the architecture of a general purpose computer which may be used to implement the above described techniques.

FIG. 5 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 6 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A computer program product embodied on a non-transitory tangible computer readable medium and provided on a computer that includes a central processing unit (CPU) and an operating system, the computer program product, comprising:
    logging code operable to log a stream of external program calls during an execution of a computer program;
    primary set identifying code operable to identify, within said stream of external program calls, a primary set of one or more external program calls matching one or more rules indicative of malicious computer program activity from among a set of rules;
    secondary set identifying code operable to identify, within said stream, at least one secondary set of one or more external program calls associated with said primary set of one or more external program calls, wherein one of said at least one secondary set of one or more external program calls (2) precedes or succeeds said primary set of one or more external program calls within said stream of external program calls and (2) originates from the same computer program, memory region, or thread of the primary set of external program calls;
    modifying code operable to modify said set of rules such that said at least one secondary set of one or more external program calls are more strongly associated with malicious computer program activity than said primary set of said one or more external program calls by increasing a score value associated with the secondary set of one or more external program for use in triggering an anti-malware response;
    wherein said set of rules is modified to include a new rule corresponding to said secondary set of one or more external program calls, said new rule thereafter being used in addition to other rules within said set of rules.

2. A computer program product as claimed in claim 1, wherein said external program calls are application program interface calls to an operating system.

3. A computer program product as claimed in claim 1, wherein each of said external program calls has one or more characteristics compared against said set of rules.

4. A computer program product as claimed in claim 3, wherein said one or more characteristics include:
    a call name;
    a return address;
    one or more parameter values;
    and one or more returned results.

5. A computer program product as claimed in claim 1, wherein rules within said set of rules specify score values of external program calls having predetermined characteristics and a set of one or more external program calls is identified as corresponding to malicious computer program activity if said set of one or more external program calls has a combined score value exceeding a threshold level.

6. A computer program product as claimed in claim 5, wherein score values within a set of rules associated with said secondary set of one or more external program calls are increased to more strongly associate said secondary set of external program calls with malicious computer program activity than said primary set of said one or more external program calls.

7. A computer program product as claimed in claim 1, wherein said set of rules include at least one of:
    one or more pattern matching rules; and
    one or more regular expression rules.

8. A computer program product as claimed in claim 1, wherein said set of rules are responsive to ordering of external program calls.

9. A computer program product as claimed in claim 1, wherein said modifying code dynamically adapts said set of rules in response to detected streams of external program calls performing malicious computer program activity.

10. A computer program product as claimed in claim 1, wherein at least changes within said set of rules are transmitted to one or more remote computers such that said one or more remote computers can use said modified set of rules without having to suffer said malicious computer program activity.

11. A computer program product as claimed in claim 1, wherein changes within said set of rules are transmitted to a rule supplier.

12. A computer program product as claimed in claim 1, wherein said stream of external program calls are logged following emulation of execution of a computer program.

13. A computer program product as claimed in claim 1, comprising starting point identifying code operable to identify a starting point of malicious computer program activity within said stream of external program calls.

14. A computer program product as claimed in claim 13, wherein said starting point corresponds to one of:
    starting execution of a computer file; and
    a switch of memory address region from which program instructions are executed.

15. A computer program product as claimed in claim 1, wherein said set of rules is subject to a validity check after modification to determine if said set of rules is more effectively detecting malicious computer program activity.

16. A method of detecting malicious computer program activity using a processor and a memory of a computer, comprising:
    logging a stream of external program calls during an execution of a computer program;
    identifying within said stream of external program calls a primary set of one or more external program calls matching one or more rules indicative of malicious computer program activity from among a set of rules;
    identifying within said stream at least one secondary set of one or more external program calls associated with said primary set of one or more external program calls, wherein one of said at least one secondary set of one or more external program calls (1) precedes or succeeds said primary set of one or more external program calls within said stream of external program calls and (2) originates from the same computer program, memory region, or thread of the primary set of external program calls;
    modifying said set of rules such that said at least one secondary set of one or more external program calls are more strongly associated with malicious computer program activity than said primary set of said one or more external program calls by increasing a score value associated with the secondary set of one or more external program for use in triggering an anti-malware response; wherein said set of rules is modified to include a new rule corresponding to said secondary set of one or more external program calls, said new rule thereafter being used in addition to other rules within said set of rules.

17. A method as claimed in claim 16, wherein said external program calls are application program interface calls to an operating system.

18. A method as claimed in claim 16, wherein each of said external program calls has one or more characteristics compared against said set of rules.

19. A method as claimed in claim 18, wherein said one or more characteristics include:
   a call name;
   a return address;
   one or more parameter values; and
   one or more returned results.

20. A method as claimed in claim 16, wherein rules within said set of rules specify score values of external program calls having predetermined characteristics and a set of one or more external program calls is identified as corresponding to malicious computer program activity if said set of one or more external program calls has a combined score value exceeding a threshold level.

21. A method as claimed in claim 20, wherein score values within a set of rules associated with said secondary set of one or more external program calls are increased to more strongly associate said secondary set of external program calls with malicious computer program activity than said primary set of said one or more external program calls.

22. A method as claimed in claim 16, wherein said set of rules include at least one of:
   one or more pattern matching rules; and
   one or more regular expression rules.

23. A method as claimed in claim 16, wherein said set of rules are responsive to ordering of external program calls.

24. A method as claimed in claim 16, wherein said step of modifying said set of rules dynamically adapts said set of rules in response to detected streams of external program calls performing malicious computer program activity.

25. A method as claimed in claim 16, wherein at least changes within said set of rules are transmitted to one or more remote computers such that said one or more remote computers can use said modified set of rules without having to suffer said malicious computer program activity.

26. A method as claimed in claim 16, wherein changes within said set of rules are transmitted to a rule supplier.

27. A method as claimed in claim 16, wherein said stream of external program calls are logged following emulation of execution of a computer program.

28. A method as claimed in claim 16, comprising identifying a starting point of malicious computer program activity within said stream of external program calls.

29. A method as claimed in claim 28, wherein said starting point corresponds to one of: starting execution of a computer file; and
   a switch of memory address region from which program instructions are executed.

30. A method as claimed in claim 16, wherein said set of rules is subject to a validity check after modification to determine if said set of rules is more effectively detecting malicious computer program activity.

31. A data processing apparatus operable to detect malicious computer program activity, said apparatus comprising:
   a central processing unit (CPU);
   an operating system;
   logging code operable to log a stream of external program calls during an execution of a computer program;
   primary set identifying code operable to identify, within said stream of external program calls, a primary set of one or more external program calls matching one or more rules indicative of malicious computer program activity from among a set of rules;
   secondary set identifying code operable to identify, within said stream, at least one secondary set of one or more external program calls associated with said primary set of one or more external program calls, wherein one of said at least one secondary set of one or more external program calls (1) precedes or succeeds said primary set of one or more external program calls within said stream of external program calls and (2) originates from the same computer program, memory region, or thread of the primary set of external program calls;
   modifying code operable to modify said set of rules such that said at least one secondary set of one or more external program calls are more strongly associated with malicious computer program activity than said primary set of said one or more external program calls by increasing a score value associated with the secondary set of one or more external program for use in triggering an anti-malware response;
   wherein said set of rules is modified to include a new rule corresponding to said secondary set of one or more external program calls, said new rule thereafter being used in addition to other rules within said set of rules.

32. An apparatus as claimed in claim 31, wherein said external program calls are application program interface calls to an operating system.

33. An apparatus as claimed in claim 31, wherein each of said external program calls has one or more characteristics compared against said set of rules.

34. An apparatus as claimed in claim 33, wherein said one or more characteristics include:
   a call name;
   a return address;
   one or more parameter values; and
   one or more returned results.

35. An apparatus as claimed in claim 31, wherein rules within said set of rules specify score values of external program calls having predetermined characteristics and a set of one or more external program calls is identified as corresponding to malicious computer program activity if said set of one or more external program calls has a combined score value exceeding a threshold level.

36. An apparatus as claimed in claim 35, wherein score values within a set of rules associated with said secondary set of one or more external program calls are increased to more strongly associate said secondary set of external program calls with malicious computer program activity than said primary set of said one or more external program calls.

37. An apparatus as claimed in claim 31, wherein said set of rules include at least one of:
   one or more pattern matching rules; and
   one or more regular expression rules.

38. An apparatus as claimed in claim 31, wherein said set of rules are responsive to ordering of external program calls.

39. An apparatus as claimed in claim 31 wherein said modifying logic dynamically adapts said set of rules in response to detected streams of external program calls performing malicious computer program activity.

40. An apparatus as claimed in claim 31, wherein at least changes within said set of rules are transmitted to one or more remote computers such that said one or more remote computers can use said modified set of rules without having to suffer said malicious computer program activity.

41. An apparatus as claimed in claim 31, wherein changes within said set of rules are transmitted to a rule supplier.

42. An apparatus as claimed in claim 31, wherein said stream of external program calls are logged following emulation of execution of a computer program.

43. An apparatus as claimed in claim 31, comprising starting point identifying logic operable to identify a starting point of malicious computer program activity within said stream of external program calls.

44. An apparatus as claimed in claim 43, wherein said starting point corresponds to one of: starting execution of a computer file; and a switch of memory address region from which program instructions are executed.

45. An apparatus as claimed in claim 31, wherein said set of rules is subject to a validity check after modification to determine if said set of rules is more effectively detecting malicious computer program activity.

46. A computer program product as claimed in claim 1, further comprising applying high level rules to said modified set of rules, and promoting said modified set of rules from said temporary set to said permanent set based on the application of the high level rules to said modified set of rules.

47. A computer program product as claimed in claim 1, wherein one or more other rules are applied to said modified set of rules to determine if said modified set of rules is more effectively detecting malicious computer program activity after modification.

* * * * *